(12) United States Patent
Shiga et al.

(10) Patent No.: US 7,606,913 B2
(45) Date of Patent: Oct. 20, 2009

(54) PRESENCE MANAGEMENT APPARATUS

(75) Inventors: Kenta Shiga, Yokohama (JP); Junji Fukuzawa, Yokohama (JP); Tooru Tanaka, Kawasaki (JP); Keisei Fujiwara, Kawasaki (JP); Satoshi Kiyoto, Fujisawa (JP)

(73) Assignee: Hitachi, Ltd., Tokyo (JP)

(*) Notice: Subject to any disclaimer, the term of this patent is extended or adjusted under 35 U.S.C. 154(b) by 825 days.

(21) Appl. No.: 10/787,459

(22) Filed: Feb. 27, 2004

(65) Prior Publication Data
US 2005/0021773 A1 Jan. 27, 2005

(30) Foreign Application Priority Data
Jun. 17, 2003 (JP) .............................. 2003-171477

(51) Int. Cl.
G06F 15/16 (2006.01)
G06F 15/177 (2006.01)
H04M 3/42 (2006.01)
H04M 11/04 (2006.01)

(52) U.S. Cl. .......................... 709/228; 709/220; 707/3; 707/4; 379/114.01; 379/201.01; 455/404.2

(58) Field of Classification Search ................. 709/228, 709/220; 707/4, 3; 379/114.01, 201.01; 455/404.2
See application file for complete search history.

(56) References Cited

U.S. PATENT DOCUMENTS

| | | | |
|---|---|---|---|
| 5,740,369 A | 4/1998 | Yokozawa et al. ..... 395/200.47 |
| 6,199,099 B1* | 3/2001 | Gershman et al. ........... 709/203 |
| 6,317,718 B1* | 11/2001 | Fano .............................. 705/1 |
| 6,356,905 B1* | 3/2002 | Gershman et al. ............. 707/10 |
| 6,401,085 B1* | 6/2002 | Gershman et al. .............. 707/4 |
| 6,957,393 B2* | 10/2005 | Fano et al. ................... 715/747 |
| 7,072,886 B2* | 7/2006 | Salmenkaita et al. ........... 707/4 |
| 7,330,895 B1* | 2/2008 | Horvitz ...................... 709/227 |
| 7,379,958 B2* | 5/2008 | Karhu ......................... 709/201 |
| 7,536,437 B2* | 5/2009 | Zmolek ...................... 709/206 |
| 2002/0035605 A1* | 3/2002 | McDowell et al. .......... 709/206 |
| 2003/0228842 A1* | 12/2003 | Heinonen et al. .......... 455/41.2 |
| 2005/0091118 A1* | 4/2005 | Fano ............................ 705/26 |
| 2005/0218206 A1* | 10/2005 | Ohno et al. ................. 235/375 |

FOREIGN PATENT DOCUMENTS

JP 2003-030527 1/2003

* cited by examiner

*Primary Examiner*—William C Vaughn, Jr.
*Assistant Examiner*—Muktesh G Gupta
(74) *Attorney, Agent, or Firm*—Antonelli, Terry, Stout & Kraus, LLP.

(57) ABSTRACT

A presence management apparatus connected to first and second apparatuses via a network includes a unit for updating a first user's presence received from the first apparatus and a second user's presence received from the second apparatus, wherein the first user uses the first apparatus and the second user uses the second apparatus; a unit for registering a matching condition for another user's presence received from the first apparatus and designated by the first user and a matching condition for another user's presence received from the second apparatus and designated by the second user; and a unit for deciding if the first and second user's presences match the designated conditions when registration processing and/or update processing is performed.

15 Claims, 12 Drawing Sheets

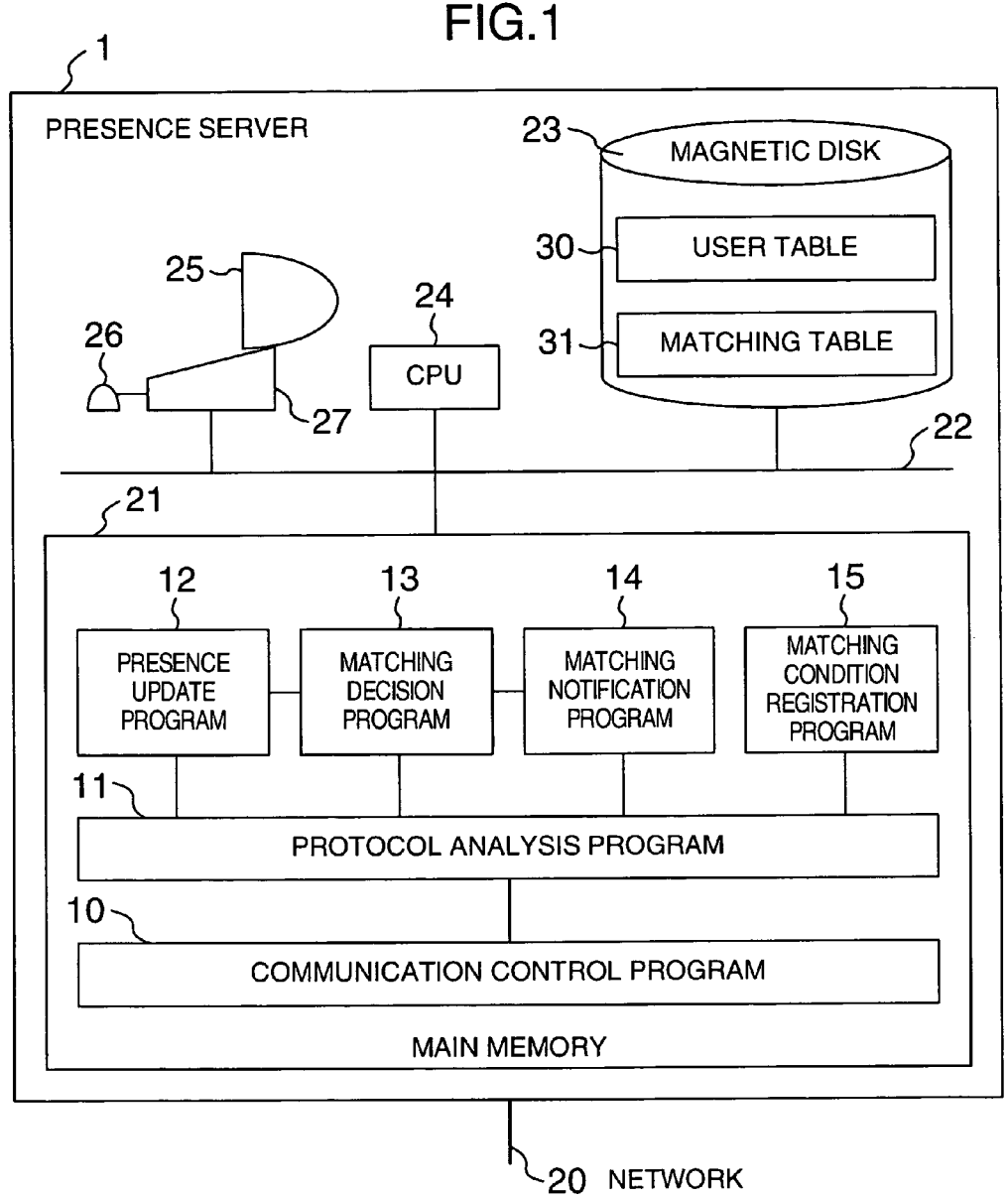

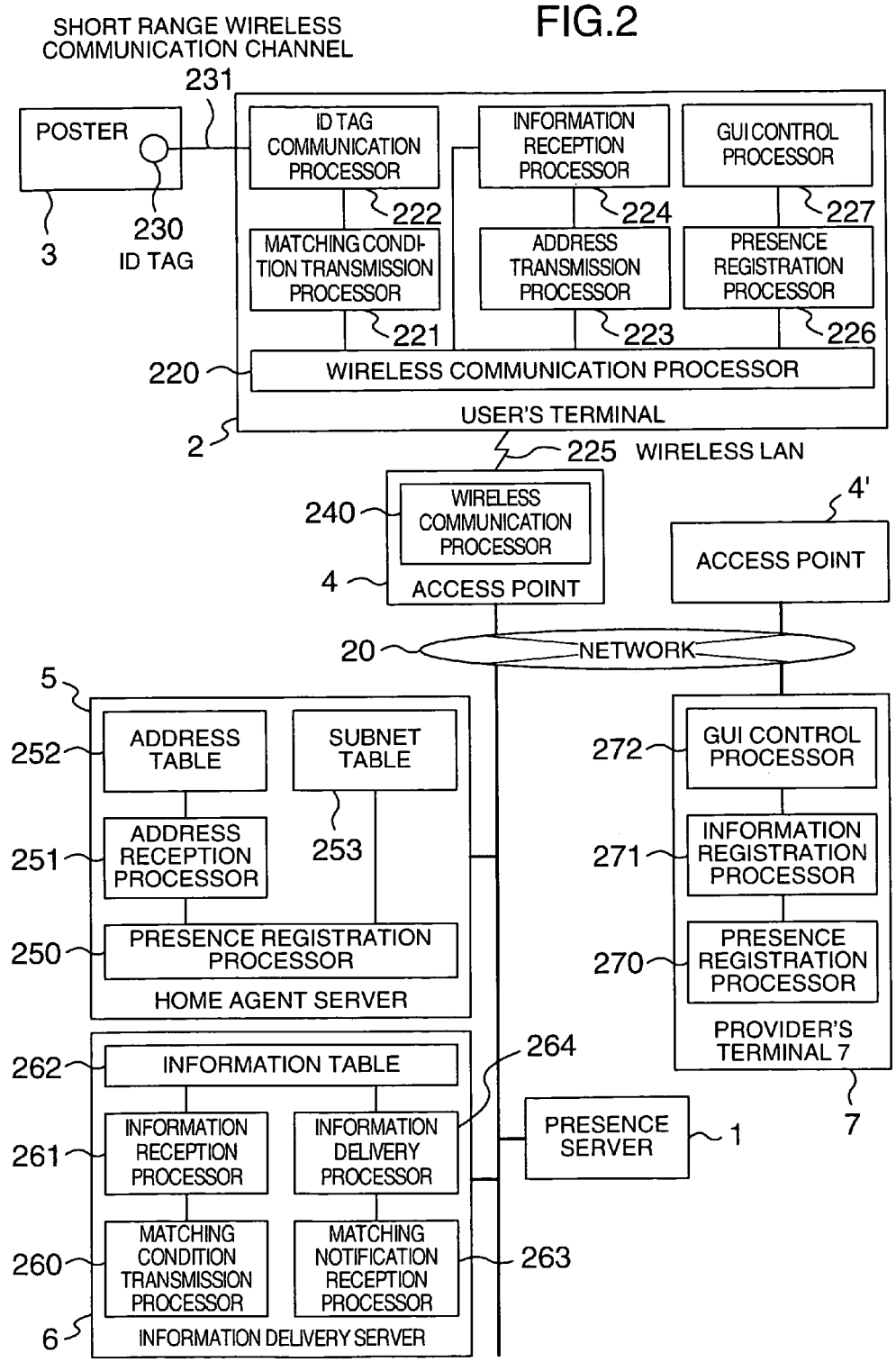

FIG.3A

30 USER TABLE

| USER ID 301 | USER TYPE 302 | MATCHING CONDITION 303 | STATUS 304 | LOCATION 305 | FIELD 306 |
|---|---|---|---|---|---|
| user-a | END USER | STATUS=TIME SALE IS ON & FIELD=Jazz & USER TYPE=PROVIDER | ONLINE | EAST ENTRANCE OF TOKYO STATION | NULL |
| user-b | END USER | FIELD=CHINESE FOOD & USER TYPE=PROVIDER | BUSY | WEST ENTRANCE OF TOKYO STATION | NULL |
| company-x | PROVIDER | LOCATION=TOKYO STATION & STATUS=ONLINE & USER TYPE=END USER | TIME SALE IS ON | NULL | Jazz |
| ... | ... | ... | ... | ... | ... |

FIG.3B

31 MATCHING TABLE

| USER ID 311 | MATCHED USER ID 312 |
|---|---|
| user-b | user-a |
| user-d | user-e |
| ... | ... |

CONDITION REGISTRATION BY END USER

INFORMATION REGISTRATION BY INFORMATION PROVIDER

FIG.5A
CONDITION DESIGNATION WINDOW
FOR PORTABLE TERMINAL DEVICE 2

- 500 CONDITION DESIGNATION WINDOW
- USER ID: [501]
- CONDITION FOR STATUS: [TIME SALES IS ON ▼] 502 / 503
- CONDITION FOR FIELD: [Jazz ▼] 504 / 505
- 506 [OK]  [CANCEL] 507

FIG.5B
INFORMATION REGISTRATION WINDOW
FOR PROVIDER'S TERMINAL 7

- 510 INFORMATION REGISTRATION WINDOW
- USER ID: [511]
- INFORMATION: [512]
- INFORMATION FIELD: [MUSIC ▼] 513 / 514
- CONDITION FOR LOCATION: [515]
- 516 [OK]  [CANCEL] 517

REGISTRATION OF LOCATION OF END USER

STATUS UPDATE BY INFORMATION PROVIDER

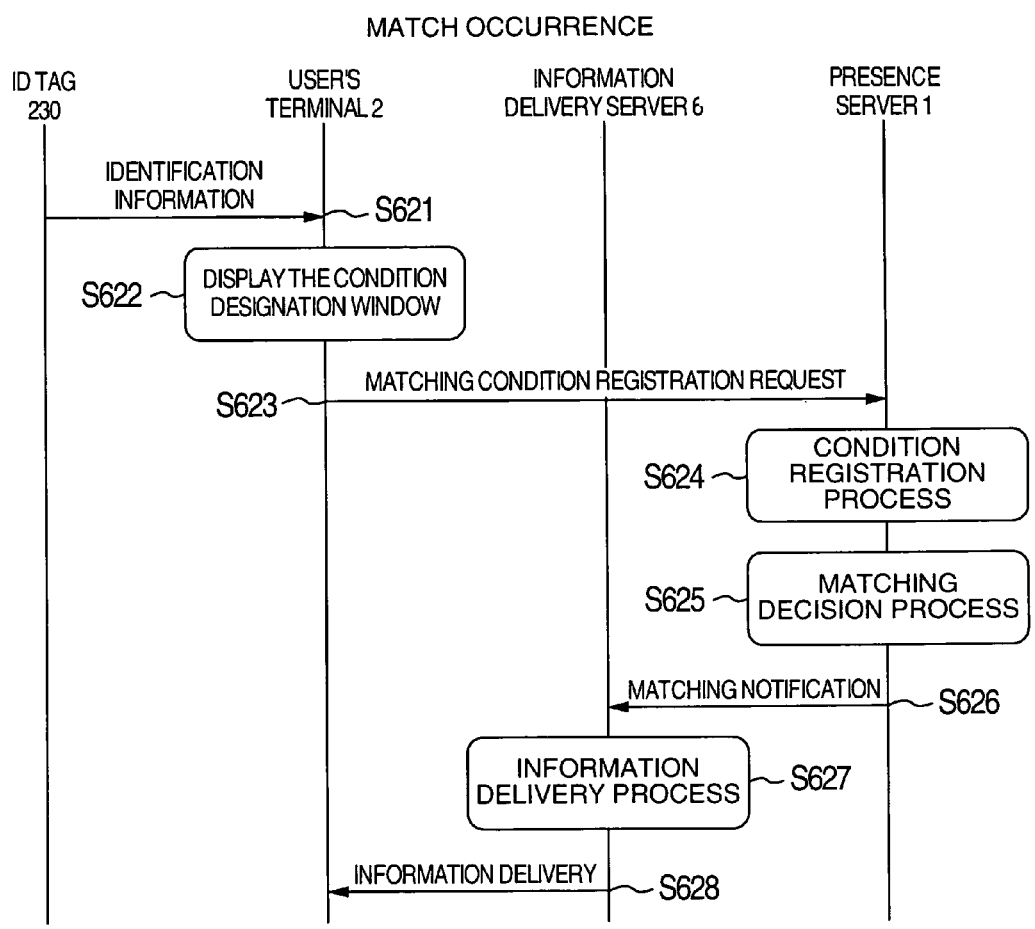

FIG.8   MATCHING DECISION PROCESS

FIG.10

30 USER TABLE

| USER ID ⌇301 | USER TYPE ⌇302 | MATCHING CONDITION ⌇303 | STATUS ⌇304 | URL ⌇305 |
|---|---|---|---|---|
| user-a | END USER | STATUS=ONLINE & URL=http://www.abc.net/~a/* & USER TYPE=END USER | ONLINE | http://www.hitachi.co.jp/products/ |
| user-b | END USER | STATUS=ONLINE & URL=http://www.abc.net/~a/* & USER TYPE=END USER | BUSY | http://www.abc.net/~a/profile.html |
| ... | ... | ... | ... | ... |

PRESENCE MANAGEMENT APPARATUS

INCORPORATION BY REFERENCE

This application claims priority based on a Japanese patent application, No. 2003-171477 filed on Jun. 17, 2003, the entire contents of which are incorporated herein by reference.

BACKGROUND OF THE INVENTION

The present invention relates to a management technology for presence that is the dynamic attribute of users of information processing devices in a system composed of a plurality of information processing devices connected to a network.

Highly portable information terminals, such as cellular phones and PDAs (Personal Digital Assistant) that have a function to connect to the Internet and a function to send and receive electronic mails and instant messages, are popular today. On the other hand, the location of an end user with a user terminal can be identified and the resulting information on the location can be stored in a server via the Internet using the wireless communication technology and the GPS (Global Positioning System) technology.

A service is now being devised that uses such a user terminal and a location management technology to directly deliver information to the user terminals of end users via an electronic mail or an instant message. The information that is delivered includes news about an area where user is now positioned and advertisements for the products and services provided by the stores in that area.

Examples of technology that realizes such a service include an information delivery system and a user terminal described in U.S. Pat. No. 5,740,369. This publication discloses an information delivery system in which the reader of an automatic ticket gate installed at a station reads the service contract data of an end user from the portable storage medium carried by the end user, the service contract data are sent to an information management device, the information management device selects information according to the contract data, and a transmission management device delivers the selected information to the user terminal of the end user.

The information delivery system and the user terminal described above allow an information provider to designate a condition for a location, which is the dynamic attribute of end users, and deliver information only to end users who match the condition. For example, the information provider can send information on the stores near the Tokyo station only to the end users who are near the Tokyo station. As a result, as compared with information delivery based on static attributes such as age and sex, timely information can be delivered.

SUMMARY OF THE INVENTION

The prior art described above does not assume that an end user frequently updates the field of interest for which the end user desires information and that an information provider changes a condition that has been designated. Therefore, even if an end user changes the field of interest after passing through the automatic ticket gate of a station, the problem is that the information on the field of interest is not delivered unless the user passes through the automatic ticket gate again.

And moreover, as the Internet and portable terminal devices become widely used, a need arises for a highly convenient service that not only solves the problem described in the above example but also accommodates frequent changes in a dynamic attribute and a designated condition.

The present invention provides an attribute and condition management technology that can accommodate frequent changes in a dynamic attribute of a service consumer and a condition designated by a service provider.

The present invention also provides a technology for providing a service based on the management technology described above.

More specifically, the present invention discloses a technology that allows an information provider to designate a condition for an end user to which information is to be delivered and, at the same time, an end user to specify a condition for information and an information provider with consideration for a frequent change in the conditions.

In one embodiment of the embodiment, there is provided a presence management apparatus, a program causing a computer to implement the presence management apparatus, or a method for implementing the presence management apparatus that is connected to a first apparatus and a second apparatus via a network. The presence management apparatus comprises presence update means for updating a first user's presence received from the first apparatus and a second user's presence received from the second apparatus, wherein the first user uses the first apparatus and the second user uses the second apparatus; matching condition registration means for registering a matching condition for another user's presence received from the first apparatus and designated by the first user and a matching condition for another user's presence received from the second apparatus and designated by the second user; and matching decision means for deciding if the first user's presence matches the matching condition designated by the second user and if the second user's presence matches the matching condition designated by the first user when the matching condition registration means performs registration processing and/or the presence update means performs update processing.

The apparatus according to present invention can issue a notification when a two-way match has occurred for a condition for the dynamic attribute (presence) frequently updated by users. The apparatus is also designed for a frequent change in the condition.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 1 shows the system configuration of a presence server used in embodiments.

FIG. 2 shows the system configuration of an information delivery system in a first embodiment.

FIGS. 3A and 3B show an example of the configuration of a user table and a matching table in the first embodiment.

FIGS. 5A and 5B show an example of the display of a condition designation window and an information registration window in the first embodiment.

FIGS. 6A, 6B and 6C show the communication sequence of location registration, status registration, and matching communication in the first embodiment.

FIG. 10 shows an example of the configuration of a user table in the second embodiment.

DESCRIPTION OF THE EMBODIMENTS

Figure 4A:
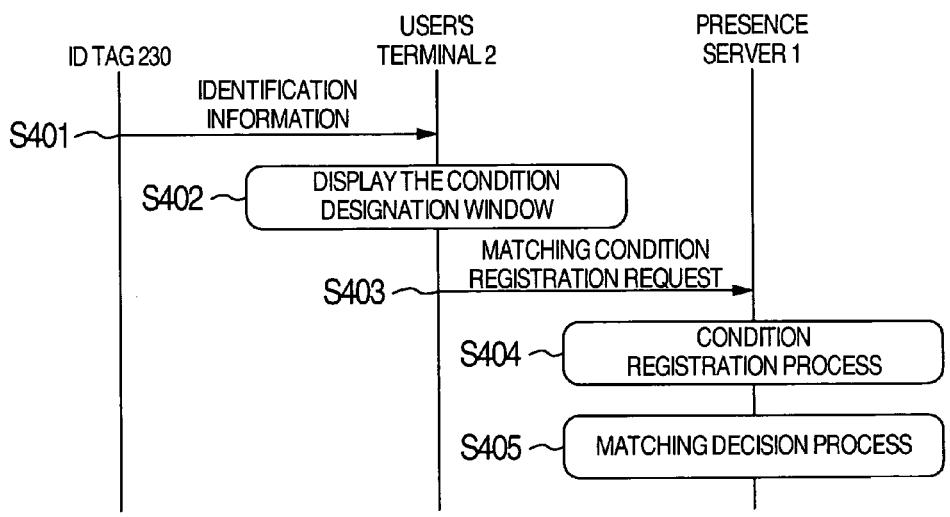
FIGS. 4A and 4B show the communication sequence of matching condition registration and information registration in the first embodiment.

Some embodiments of the present invention will be described below with reference to the drawings. In the drawings, the same reference numerals denote the same structural elements.

In a first embodiment, an information delivery system will be described in which a presence management device (hereinafter called a presence server) 1 such as the one shown in FIG. 1 is connected to a portable terminal device (hereinafter called a user's terminal) 2 used by an end user, an access point device (hereinafter called an access point) 4, a home agent server device (hereinafter called a home agent server) 5, an information delivery server device (hereinafter called an information delivery server) 6, and an information provider terminal (hereinafter called a provider's terminal) 7, all of which are shown in FIG. 2, via a network 20 such as a wireless LAN 225, for example, an IEEE802.11b conforming LAN, and the Internet.

In the information delivery system in this embodiment, an information provider can use location information to narrow down end users to which information such as news, advertisements, and electronic coupons are to be delivered and, at the same time, an end user can also narrow down information providers, from which information is to be delivered, based on the field of information and the dynamic attribute (whether a time sale is on) of information providers. The system also assumes that those conditions frequently change. To simplify the designation of an information field by an end user, the user's terminal 2 has a function to communicate with an ID tag, a small IC chip with the information storage function and the wireless communication function. When an end user with the user's terminal 2 approaches a poster to which an ID tag is attached, the user's terminal 2 can receive an information field included in the poster.

In this embodiment, an end user and an information provider are collectively called users. The dynamic attribute of a user is called presence, and a condition for presence is called a matching condition. In the information delivery system in this embodiment, the presence of an end user is concerned with status and a location. The status of an end user includes the following: "online" indicating that the user's terminal 2 is connected to the network, "offline" indicating that the user's terminal 2 is not connected to the network, "away" indicating that the user's terminal 2 is connected to the network but the end user is not on the user's terminal 2, and "busy" indicating that the user's terminal 2 is connected to the network but the end user is busy and does not want for information to be delivered. The presence of an information provider is concerned with status and an information field to be delivered. The status of an information provider includes "time service" and "normal operation".

The presence server 1 comprises a central processing unit (hereinafter called a CPU) 24, a secondary storage device (hereinafter called a magnetic disk) 23 such as a hard disk, a primary storage memory (hereinafter called a main memory) 21, a communication line 22 such as a bus, an output device (hereinafter called a display) 25 such as a display device, a character input device 27 such as a keyboard, and a pointing device 26 such as a mouse, a touch screen, or a stylus pen. The presence server 1 is connected to the network 20 to communicate with other devices.

The magnetic disk 23 stores a user table 30 in which user information is stored and a matching table 31 in which the ID of a user matching the matching condition of another user is saved temporarily. Those tables may also be stored in the main memory 21.

The main memory 21 stores a communication control program 10 that controls communication with other devices via the network 20, a protocol analysis program 11 that analyzes the communication protocol for presence updating, matching condition designation, and matching notification, a presence update program 12 that updates presence information stored in the user table 30, in response to a presence update request, a matching decision program 13 that judges if the matching is satisfied in two ways, a matching notification program 14 that notifies a user that the matching is satisfied in two ways, and a matching condition registration program 15 that receives a matching condition from a user and registers it with the user table 30.

Those programs are run by the CPU 24 as necessary for executing the process described below in the presence server 1. The programs are stored in the magnetic disk 23 in advance, or those programs are read from luggable storage media or downloaded from another device into the magnetic disk 23 via the network 20, which is one of communication media, or via the carrier waves over the network 20. The stored programs are transferred to the main memory 21 as necessary.

Although the configurations are not shown, the user's terminal 2, access point 4, home agent server 5, information delivery server 6, and provider's terminal 7 each comprise a CPU, memories such as a semiconductor memory and a magnetic disk, a communication line such as a bus, a display, a character input device such as a keyboard, and a pointing device such as a touch screen or a stylus pen. They are connected to other devices via the network 20 or the wireless LAN 225. Note that the user's terminal 2 need not have a character input device. Also note that the access point 4, home agent server 5, and information delivery server 6 need not have a display, a character input device, and a pointing device. The memory stores the OS and at least one program for execution by the CPU as necessary to realize the processors described below in each device. The programs may be stored in the internal memory in advance, or the programs may be read from a portable recording medium or downloaded from another device into the internal memory via the network 20, which is a communication medium, or via the carrier waves over the network 20.

The user's terminal 2 comprises an ID tag communication processor 222 that communicates with an ID tag 230 attached to a medium such as a poster and a dangler (hereinafter called a poster) 3 using a short range communication channel 231 such as an infrared ray and reads identification information on the poster 3 from the ID tag 230; a matching condition transmission processor 221 that transmits a matching condition to the presence server 1 according to the information read from the ID tag; a wireless communication processor 220 that requests the access point 4 to assign a care of address, receives the assigned care of address, and communicates with other devices using the care of address; an address transmission processor 223 that transmits the care of address to the home agent server 5; an information reception processor 224 that receives information such as news, advertisements, and electronic coupons from the information delivery server 6; a presence registration processor 226 that registers status information with the presence server 1; and a GUI control processor 227 that provides an end user with a graphical user interface. The identification information on the poster 3 is supposed to include an information field described on the poster 3.

The presence registration processor 226 described above collects the status of a user from the end user's operation or through the communication with a program running in the user's terminal 2 and sends the collected status to the presence server 1. For example, the status "online" and "offline" is received from the OS of the user's terminal 2 when the user's terminal 2 is turned on and off, respectively. The status "away" is received from the OS of the user's terminal 2 when the user's terminal 2 does not accept a user operation for a given length of time. The status "busy" is entered by an end user using the user interface provided by the GUI control processor 227.

The access point 4, connected to the wireless LAN 225 and the network 20, comprises a wireless communication processor 240 that assigns a care of address in response to a request from the user's terminal 2 and relays data between the user's terminal 2 and a device connected to the network 20. In the information delivery system in this embodiment, it is supposed that there is at least one access point 4 and that the user's terminal 2 can communicate with at least one access point 4 from its location. It is supposed that the subnet addresses of an assigned care of address differ according to the access point 4.

The home agent server 5, connected to the network 20, comprises an address table 252 in which the care of address of the user's terminal 2 is stored; a subnet table 253 in which the correspondence between subnet addresses and physical locations is stored; an address reception processor 251 that receives the care of address from the user's terminal 2 and records it in the address table 252; and a presence registration processor 250 that uses the subnet address calculated from the care of address of the user's terminal 2 and the subnet table 253 to calculate the location of the user's terminal 2 and sends the location to the presence server 1.

The provider's terminal 7 comprises an information registration processor 271 that registers information delivered by an information provider and its delivery condition with the information delivery server 6; a presence registration processor 270 that registers the status of the information provider, for example, a time sale flag indicating whether the time sale is now on, with the presence server 1; and a GUI control processor 272 that provides the information provider with a graphical user interface.

The information delivery server 6 comprises an information table 262 in which information to be delivered is stored; an information reception processor 261 that records information received from the provider's terminal 7 in the information table 262; a matching condition transmission processor 260 that transmits a matching condition to the presence server 1 based on an information delivery condition sent by the provider's terminal 7; a matching notification reception processor 263 that receives a matching notification from the presence server 1; and an information delivery processor 264 that transmits information to the user's terminal 2 of an end user when a matching notification is received.

The user table 30, matching table 31, address table 252, subnet table 253, and information table 262 are of an array structure and can store one or more records. As shown in FIG. 3A, each record of the user table 30 is composed of an user ID 301 that uniquely identifies a user, a user type 302 that stores the type of the user (end user or information provider), a matching condition 303 that indicates a condition for other users designated by the user, status 304 representing the status of the user, a location 305 of the user, and a field 306 indicating information owned by the user. The matching condition 303 is described in the format "presence item name=value". One or more expressions may be combined with "&" representing a logical product and a "|" representing a logical sum. NULL, if designated for the location 305 and the field 306, indicates that no data is stored.

As shown in FIG. 3B, each record of the matching table 31 is composed of a user ID 311 and a matched user ID 312 that is the user ID of a user whose presence matches the matching condition of the user identified by the user ID 311.

Each record of the address table 252 is composed of a home address that is a permanent address assigned to the user's terminal 2 in advance and a care of address that changes according to the access point 4 with which the terminal communicates. Each record of the subnet table 253 is composed of the subnet address of a care of address and information on the location at which the access point 4 corresponding to the subnet is installed; they are registered in advance by the system manager of the information delivery system in this embodiment. The information table 262 is composed the user ID of an information provider and information.

Next, the communication sequence of this embodiment will be described with reference to FIGS. 4A-4B and FIGS. 6A-6C. Because the access point 4 only relays communication between the user's terminal 2 and some other devices, the processing of the access point 4 is omitted from the description of the communication sequence.

FIG. 4A shows a communication sequence executed when an end user registers a matching condition. When an end user with the user's terminal 2 approaches the poster 3, the ID tag 230 sends identification information on the poster 3 to the user's terminal 2 (S401). The ID tag communication processor 222 of the user's terminal 2 receives this identification information and, from the identification information, extracts the information field described on the poster 3. For example, if the poster 3 is a poster about a jazz concert, the information field is "Jazz". Then, the GUI control processor 227 displays a condition designation window 500 such as the one shown in FIG. 5A (S402).

When the end user presses a button 506 on the condition designation window 500, the matching condition transmission processor 221 creates a matching condition registration request based on the user ID entered in an area 501 in the condition designation window 500, the status selected in an area 502, and the field selected in an area 504 and sends the request to the presence server 1 (S403). This matching condition registration request includes a user ID and a matching condition. For example, when the end user user-a selects "Time sale is on" in the area 502 and "Jazz" in the area 504, the matching condition registration request includes the user ID "user-a" and the matching condition "Status=Time sale is on & Field=Jazz & User type=Provider". The condition expression for the user type is added regardless of the contents entered in the condition designation window 500. When the communication control program 10 of the presence server 1 receives the matching condition registration request described above, the presence server 1 executes condition registration process (S404).

When the condition registration process is executed, the protocol analysis program 11 first extracts the user ID and the matching condition from the matching condition registration request described above and the matching condition registration program 15 updates the matching condition 303 in the user table 30. Finally, the matching decision program 13 executes matching decision process such as the one shown in FIG. 7 and FIG. 8 (S405). Because there is no information provider that matches the matching condition designated by the end user user-a in S402, no matching notification is issued in S405.

Figure 4B:
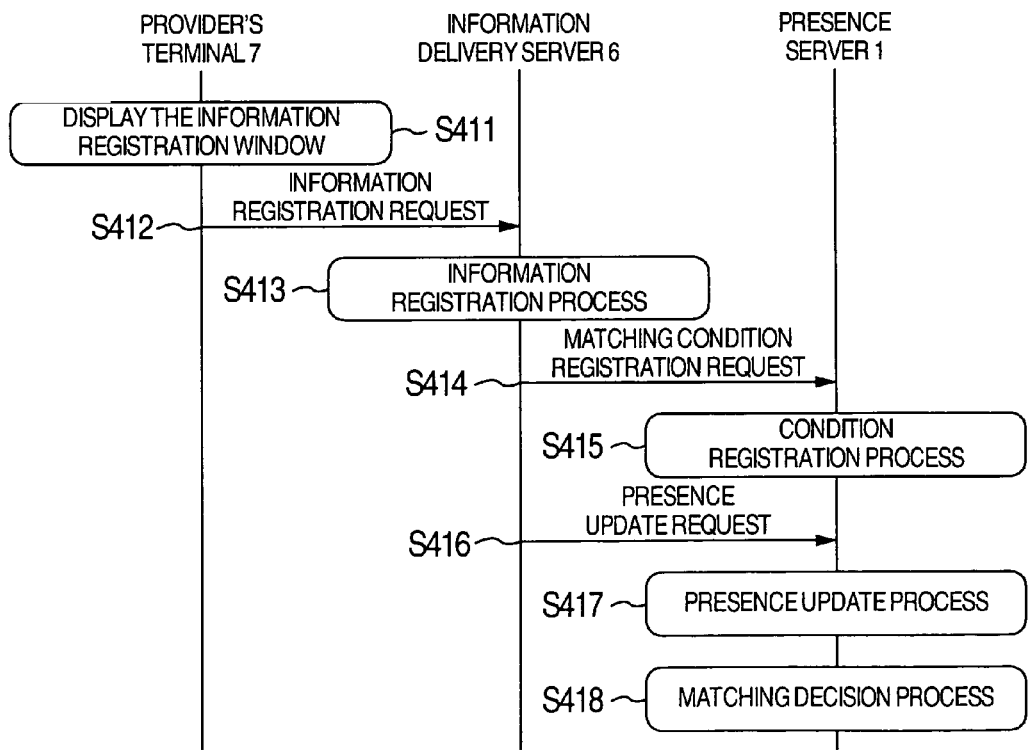

FIG. 4B shows the communication sequence executed when an information provider registers a matching condition. When the GUI control processor 272 of the provider's terminal 7 displays an information registration window 510 such as the one shown in FIG. 5B (S411) and the information provider presses a button 516, the information registration processor 271 creates an information registration request from the user ID entered in an area 511 in the information registration window 510, the information entered in an area 512, the field selected in an area 513, and the condition for the location entered in an area 515 and sends the request to the information delivery server 6 (S412).

This information registration request includes the user ID of an information provider, information to be delivered, an information field, and a matching condition. For example, when the information provider company-x selects "Pops" in the area 513 and enters "East entrance of Tokyo station" in the area 515, the information registration request includes the user ID "company-x", the information field "Pops", and the matching condition "Location=East entrance of Tokyo station & Status=Online & User type=End user". The condition expression for the status and that for the user type are added regardless of the contents entered in the information registration window 510. The information reception processor 261 of the information delivery server 6 receives this information registration request and stores the information to be delivered in the information table 262 (S413). Next, the matching condition transmission processor 260 sends the matching condition to the presence server 1 (S414), and the matching condition registration program 15 of the presence server 1 executes condition registration process as in S404 (S415).

Next, the matching condition transmission processor 260 creates a presence update request and sends it to the presence server 1 (S416). This presence update request includes the user ID of an information provider, status, and an information field. When the communication control program 10 of the presence server 1 receives this presence update request, the presence server 1 executes presence update process (S417). When the presence update process is executed, the protocol analysis program 11 first extracts the user ID and the presence (the status and the field in this example) from the presence update request described above and the presence update program 12 updates the presence in the user table 30 (304 to 306). Finally, the matching decision program 13 executes matching decision process (S418). Because the location of the end user user-a is not yet registered, no matching notification is issued in S418.

Next, the graphical user interface (GUI) used in this embodiment will be described.

FIG. 5A shows an example of the display of the condition designation window 500 in which an end user designates a condition for the presence of an information provider. When the ID tag communication processor 222 receives an identification information and extracts an information field described on the poster 3 from the ID tag 230, the GUI control processor 227 displays the condition designation window 500. The condition designation window 500 is composed of the area 501 in which the-user ID of an end user is entered, the area 502 in which a condition for the status of an information provider is designated, a button 503, the area 504 in which an information field desired by the end user is displayed, a button 505, a button 506 used to complete the condition designation, and a button 507 used to cancel the condition designation.

The end user can select the status displayed in the area 502 by pressing the button 503. The field displayed in the area 504 is extracted from the identification information on the poster 3 received by the ID tag communication processor 222; the user can select another field by pressing the button 505. When the button 506 is pressed, the matching condition transmission processor 221 of the user's terminal 2 sends the matching condition to the presence server 1.

FIG. 5B shows an example of the display of the information registration window 510 used by an information provider. This window is used to designate information to be delivered and a condition for an end user to which the information is to be delivered and to request to start the matching operation. The GUI control processor 272 of the provider's terminal 7 displays the information registration window 510. The information registration window 510 is composed of the area 511 in which the user ID of the information provider is entered, the area 512 in which information to be delivered is entered, the area 513 in which the field of information entered in the area 512 is designated, a button 514, the area 515 in which a condition for the location of an end user is designated, the button 516 used to complete the information registration, and a button 517 used to cancel the information registration. The information provider can select the field displayed in the area 513 by pressing the button 514. When the button 516 is pressed, the information registration processor 271 of the provider's terminal 7 sends an information registration request to the information delivery server 6. Note that the information to be delivered may be designated by the path name of a file containing information to be delivered.

Figure 6A:
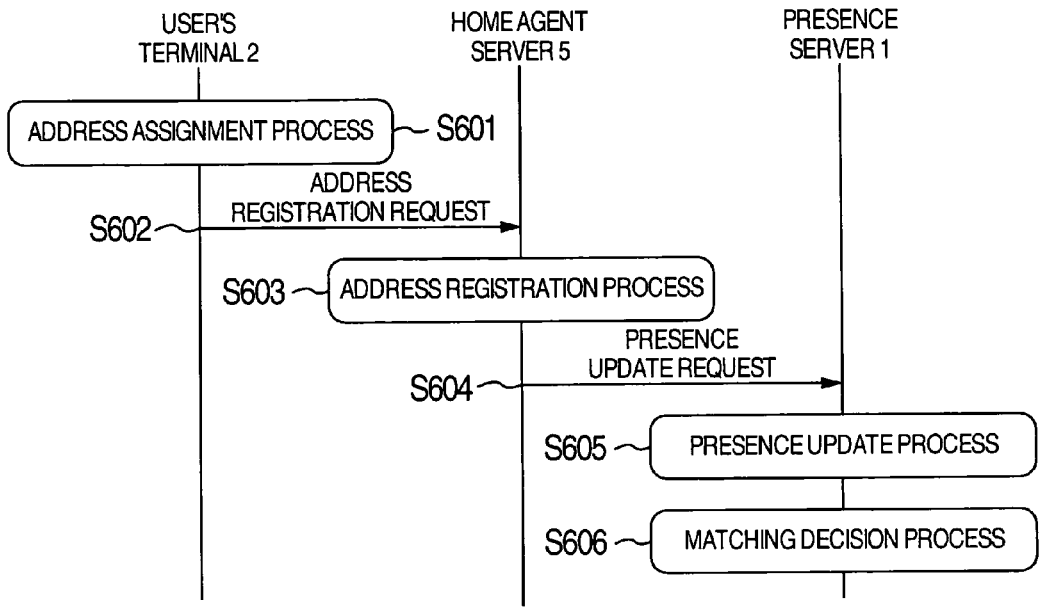

FIG. 6A shows the communication sequence executed when the location of an end user is registered. When a communication path (wireless LAN 225) to the access point 4 is established, the user's terminal 2 sends a care of address assignment request to the access point 4 (S601). After that, a care of address is received from the access point 4, the address transmission processor 223 of the user's terminal 2 sends an address registration request to the home agent server 5 (S602). This address registration request includes the user ID, the care of address, the subnet address, and the home address. In response to this address registration request, the address reception processor 251 of the home agent server 5 stores the correspondence between the home address and the care of address in the address table 252 (S603). The presence registration processor 250 searches the subnet table 253 for the location of the subnet using the subnet address as the key. Then, the presence registration processor 250 creates a presence update request and sends it to the presence server 1 (S604).

The presence update request includes a user ID and a location. For example, when the user's terminal 2 of the end user user-a communicates with the access point 4 installed at the east entrance of the Tokyo station in S601, the location in the presence update request is "East entrance of Tokyo station". When the communication control program 10 of the presence server 1 receives this presence update request, the presence server 1 executes presence update process (S605). When presence update process is executed, the protocol analysis program 11 first extracts the user ID and the presence (location in this example) from the presence update request and the presence update program 12 updates the presence (304 to 306) in the user table 30. Finally, the matching decision program 13 executes matching decision process (S606). In S606, although the end user user-a matches the matching condition of the information provider company-x, neither the status nor the field of the information provider company-x match the matching condition of the end user user-a. Therefore, no matching notification is issued.

Figure 6B:
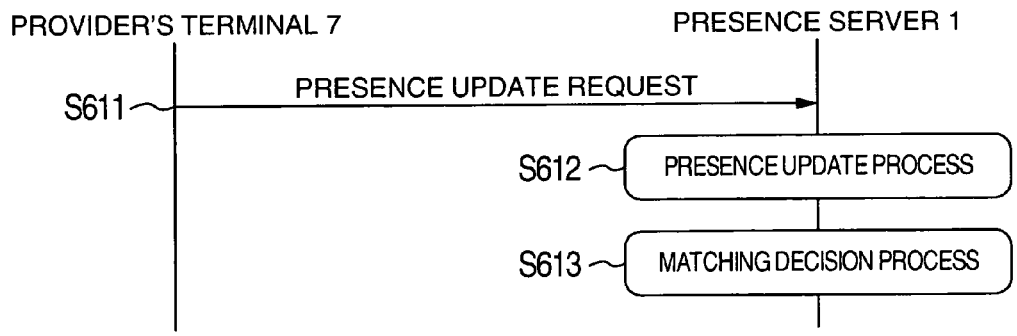

FIG. 6B shows the communication sequence executed when an information provider updates the status. When the information provider updates the status using the window (not shown) displayed and controlled by the GUI control processor 272 of the provider's terminal 7, the presence registration processor 270 sends a presence update request to the presence server 1 (S611). For example, the information provider company-x can change the status to "Time sale is on". In response to the presence update request, the presence server 1 executes the same presence update process as that in S605 (S612) and executes the same matching decision process as that in S606 (S613). In S613, although the status of the information provider company-x matches the matching condition of the end user user-a, no match occurs in the field. Therefore, no matching notification is issued.

FIG. 6C shows the communication sequence executed when an end user registers a matching condition and a resulting matching notification is issued. When the end user approaches another poster 3' different from the poster 3 approached by the end user in FIG. 4A, an ID tag 230' attached to the poster 3' sends identification information to the user's terminal 2 (S621). For example, assume that the poster 3' is a poster about the information field "Pops". As in FIG. 4A, the user's terminal 2 displays the condition designation window (S622) and sends a matching condition registration request (S623), and the presence server 1 executes condition registration process (S624) and matching decision process (S625). At this time, the presence of the end user user-a matches the matching condition of the information provider company-x and, at the same time, the presence of the information provider company-x matches the matching condition of the end user user-a. Therefore, the matching decision program 13 decides that a two-way match has occurred, and the matching notification program 14 sends a matching notification to the information delivery server 6 (S626).

This matching notification includes the user IDs of the end user and the information provider matching the matching condition. The matching notification reception processor 263 of the information delivery server 6 receives this matching notification and, from this notification, obtains the user IDs of the end user and the information provider (S627). The information delivery processor 264 searches the information table 262 using the user ID of the information provider as the key to read information to be delivered and delivers the information to the user's terminal 2 of the end user (S268).

Figure 7:
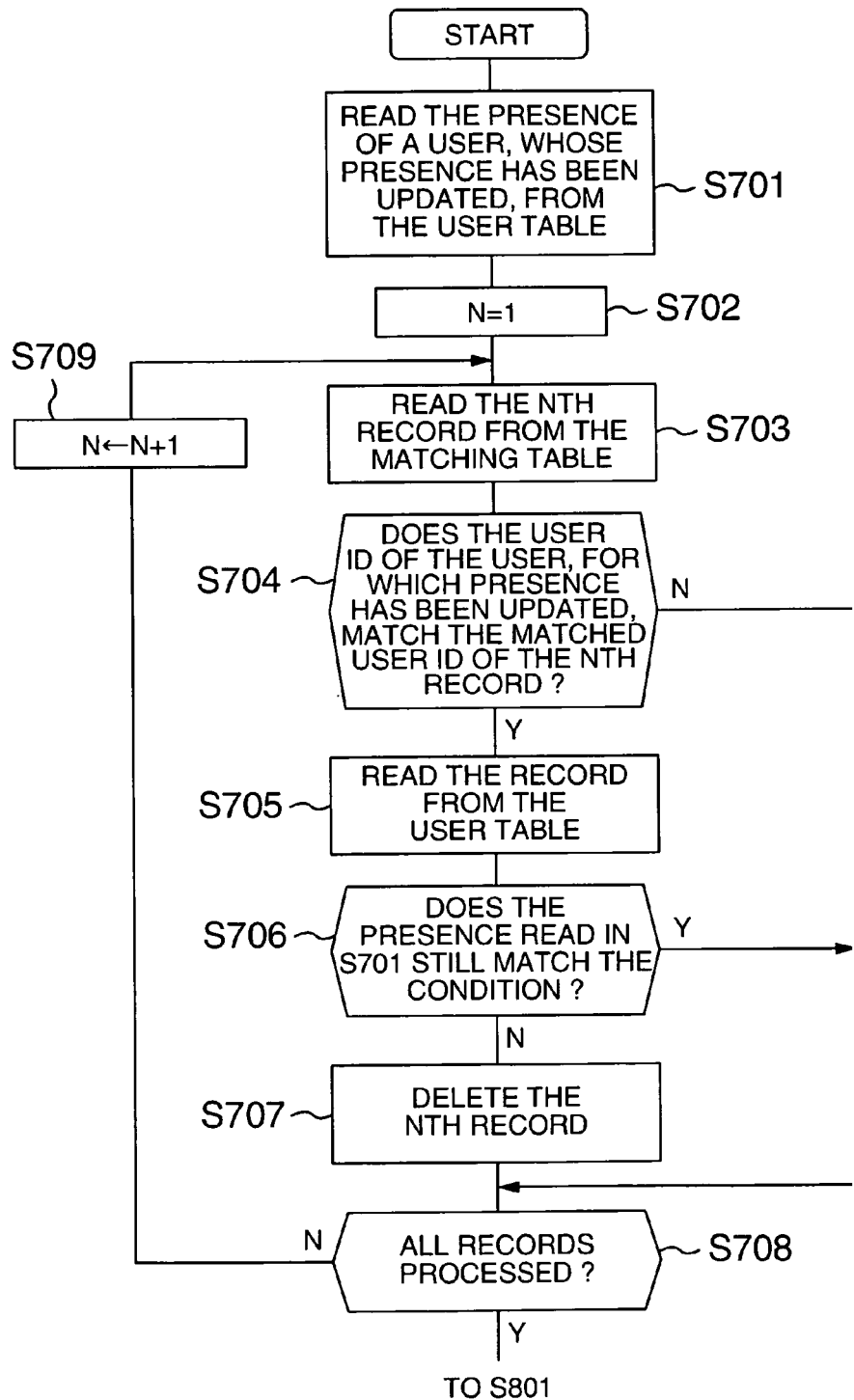
FIG. 7 is a flowchart showing the first phase of the matching decision process in the embodiments.
Figure 8:
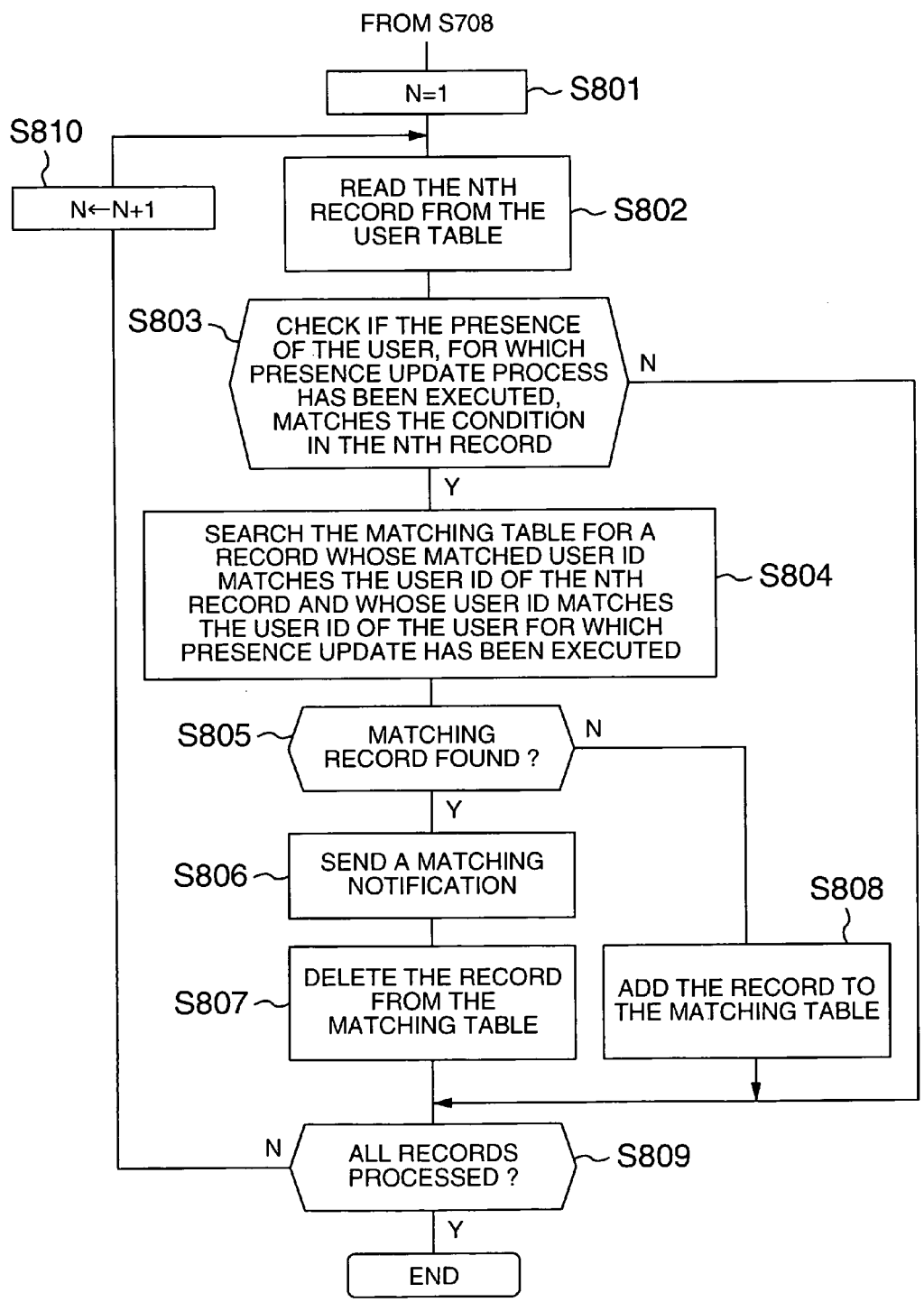
FIG. 8 is a flowchart showing the second phase of the matching decision process in the embodiments.

Next, with reference to FIG. 7 and FIG. 8, the following describes the process sequence of matching decision process executed by the matching decision program 13 after the condition registration process and presence update process. The matching decision process is divided into two phases. In the first phase described in FIG. 7, the matching decision program 13 verifies the validity of the matching candidates already stored in the matching table 31. In the second phase shown in FIG. 8, the matching decision program 13 verifies if a user for which matching condition registration or presence update has been executed matches the condition of another user and, if a match occurs between the two users, the matching decision program 13 sends a matching notification.

In the first phase, the program 13 first reads the presence (status, location, and field in this example) of a user, for which matching condition registration or presence update has been executed, from the user table 30 (S701). Then, the program 13 sets the counter N to 1 (S702), reads the Nth record from the matching table 31 (S703) and checks if the user ID of the user, for which matching condition registration or presence update has been executed, matches the matched user ID 312 of the Nth record (S704). If they match, the program 13 reads the condition designated by the user whose ID is the user ID 311 of the Nth record from the user table 30 (S705) to check if the presence read in S701 still matches the condition read in S705 (S706). If they do not match, the program 13 deletes the Nth record from the matching table 31 to delete it from the matching candidates (S707). If the user IDs do not match in S704 or if the presence still matches the condition in S706, process of S708 is executed. The program 13 executes the steps from S703 to S707 for all records in the matching table 31 (S708, S709).

In the second phase, the program 13 first sets the counter N to 1 again (S801), reads the Nth record from the user table (S802), and checks if the presence read in S701 matches the condition of the Nth record (S803). If they match, the program 13 searches the matching table 31 for a record whose matched user ID 312 matches the user ID 301 of the Nth record and whose user ID 311 matches the user ID of the user for which matching condition registration or presence update has been executed (S804). The program 13 checks whether or not there is such a record (S805) and, if there is such a record, decides that a two-way match has occurred. The matching notification program 14 sends a matching notification (S806) and deletes the record from the matching table 31 (S807). If there is no such record in S805, the matching decision program 13 decides that a new matching candidate is found and adds the record to the matching table 31 (S808). In S808, the user ID 301 of the Nth record is written in the user ID 311 of the record, and the user ID of the user for which matching registration or presence update has been executed is written in the matched user ID 312. If the presence does not match the condition in S803, process of S809 is executed. The matching decision program 13 executes steps S802 to S808 for all records in the user table (S809, S810).

In the information delivery system in the first embodiment described above, the information provider can select end users, to whom information such as news, advertisements, and electronic coupons are to be delivered, based on the location. At the same time, end users can select information providers, from which information is to be delivered, based on the information field and the presence of information providers. The system can also be used in a situation where those conditions frequently vary.

In the first embodiment, the user's terminal 2 may be a cellular phone. Although the home agent server 5 registers a location with the presence server 1 in the first embodiment, the user's terminal 2 or a cellular phone with the GPS terminal function may also register a location with the presence server 1.

Figure 9:
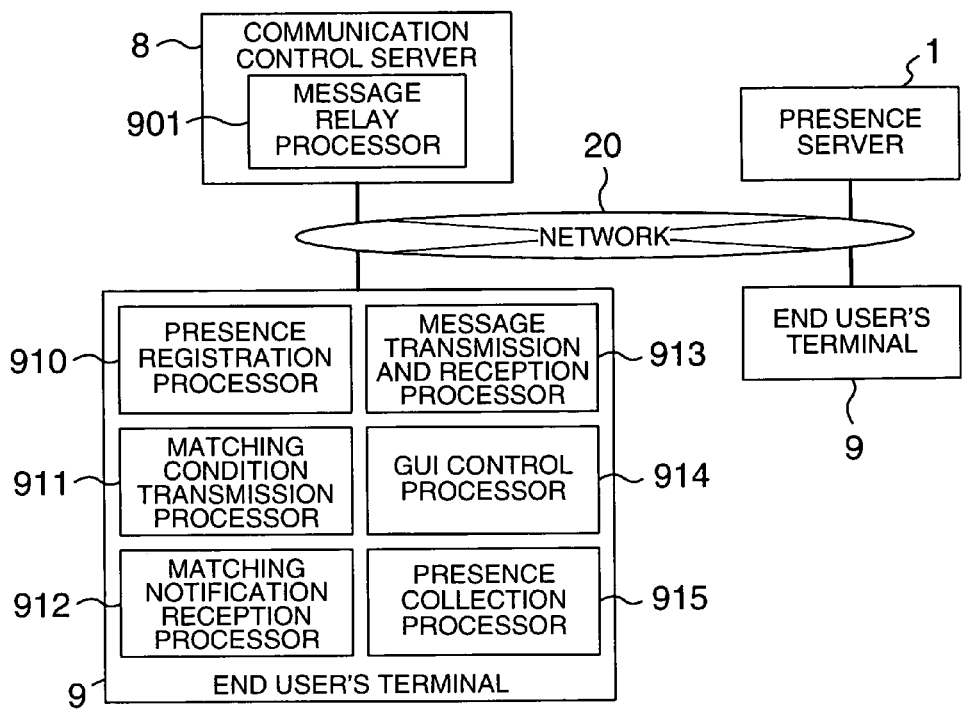
FIG. 9 shows the system configuration of a communication system in a second embodiment.

Next, a second embodiment of the present invention will be described with a focus on the difference from the first embodiment. In the second embodiment, a communication system will be described in which the presence server 1 shown in FIG. 1 is connected to a communication control server 8 and end user terminal devices (hereinafter called a user's terminal) 9, such as those shown in FIG. 9, via the network 20.

Although the configuration is not shown, the communication control server 8 and the user's terminal 9 each comprises a CPU, memories such as a semiconductor memory and a magnetic disk, a communication line such as a bus, a display, a character input device such as a keyboard, a touch screen, and a pointing device such as a stylus pen. They are connected to other devices via the network 20. Note that the communication control server 8 need not have a display, a character input device, and a pointing device. The memory stores the OS and at least one program for execution by the CPU as necessary to realize the processors described below in each device. The programs may be stored in the internal memory in advance, or those programs may be read from luggable storage media or downloaded from other devices via the network 20, which is one of communication media, or via the carrier waves over the network 20.

In the communication system in the second embodiment, the presence of an end user is concerned with status and the URL of a web page accessed by an end user. After a matching condition is designated for status and a URL, the end user receives a notification when a two-way match occurs. Then, the end user can start real-time communication with the end user at the other end user using an instant message or an IP phone. This allows the end users browsing the same web page or the end users browsing each other's web page to communicate, thus providing a service that activates real-time communication.

The communication control server 8 has a message relay processor 901 that transfers a message, received from one user's terminal 9, to another user's terminal 9 designated as the destination. The message relay processor 901 also transfers a presence update request or a matching condition registration request, received from the user's terminal 9, to the presence server 1. In addition, the message relay processor 901 transfers a matching notification, received from the presence server 1, to the user's terminal 9. For example, the communication control server 8 operates according to SIP (Session Initiation Protocol) defined in RFC 3261.

The user's terminal 9 comprises a presence collection processor 915 that collects the presence of an end user; a presence registration processor 910 that sends a user presence collected by the presence collection processor 915 to the presence server 1 via the communication control server 8; a matching condition transmission processor 911 that sends a matching condition to the presence server 1 via the communication control server 8; a matching notification reception processor 912 that receives a matching notification from the presence server 1 via the communication control server 8; a message transmission and reception processor 913 that sends and receives a message to and from other user's terminals 9 via the communication control server 8; and a GUI control processor 914 that provides an end user with a graphical user interface.

The presence collection processor 915 described above collects the presence of an end user from the end user's operation or through the communication with a program running in the user's terminal 9. For example, the status "online" and "offline" is received from the OS of the user's terminal 9 when the user's terminal 9 is turned on and off, respectively. The status "away " is received from the OS of the user's terminal 9 when the user's terminal 9 does not accept an end user operation for a given length of time. The status "busy" is entered by an end user using the user interface provided by the GUI control processor 914, which notifies the presence collection processor 915 about it. The URL accessed by an end user is received from a web browser.

As shown in FIG. 10, a user table 30 in the second embodiment comprises a user ID 301, a user type 302, a matching condition 303 designated by the user, a status 304 representing the status of the user, and a URL 305 of a web page accessed by the user. A matching table 31 is the same as that in the first embodiment.

The graphical user interface (GUI) used in this embodiment will be described.

Figure 11:
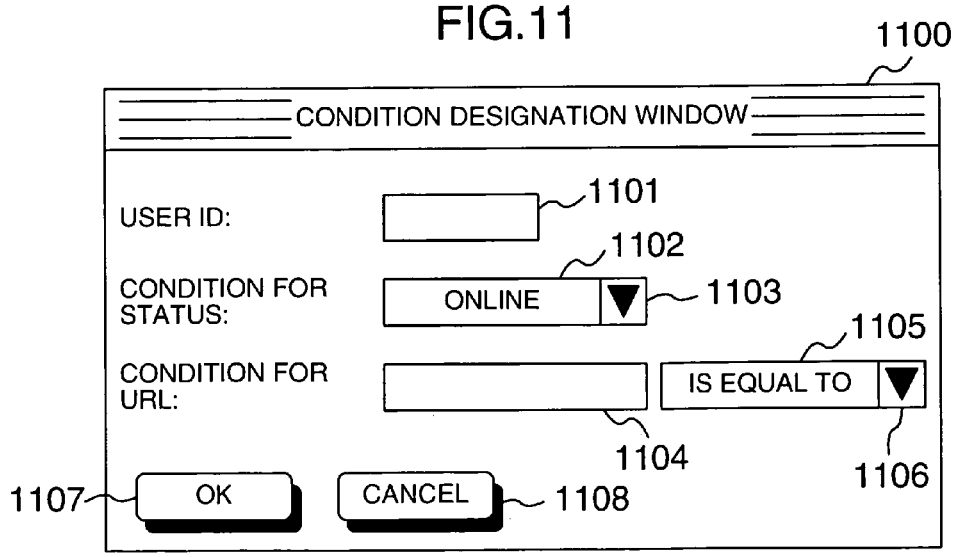
FIG. 11 shows an example of the display of a condition designation window in the second embodiment.

FIG. 11 shows an example of the display of a condition designation window 1100 used by an end user to designate a matching condition. The GUI control processor 914 of the user's terminal 9 displays the condition designation window 1100. The condition designation window 1100 is composed of an area 1101 in which the user ID of a user is entered, an area 1102 in which a condition for a status which is one of presence components is entered, a button 1103 used to select a condition displayed in the area 1102, an area 1104, an area 1105 and a button 1106 in which a condition for a URL which is one of presence components is designated, a button 1107 used to complete a condition designation, and a cancel button 1108 used to cancel a condition designation. The URL of an end user is entered wholly or in part in the area 1104, and a checking rule used to check if the URL matches the condition is displayed in the area 1105. For example, the checking rule includes "is equal to" representing an equal sign, "beginning with" representing a forward match, "ended with" representing a backward match, and "including" representing a partial match. An end user can select a checking rule displayed in the area 1105 by pressing the button 1106. When the button 1107 is pressed, the matching condition transmission processor 911 of the user's terminal 9 sends a matching condition registration request to the presence server 1 via the communication control server 8.

Figure 12:
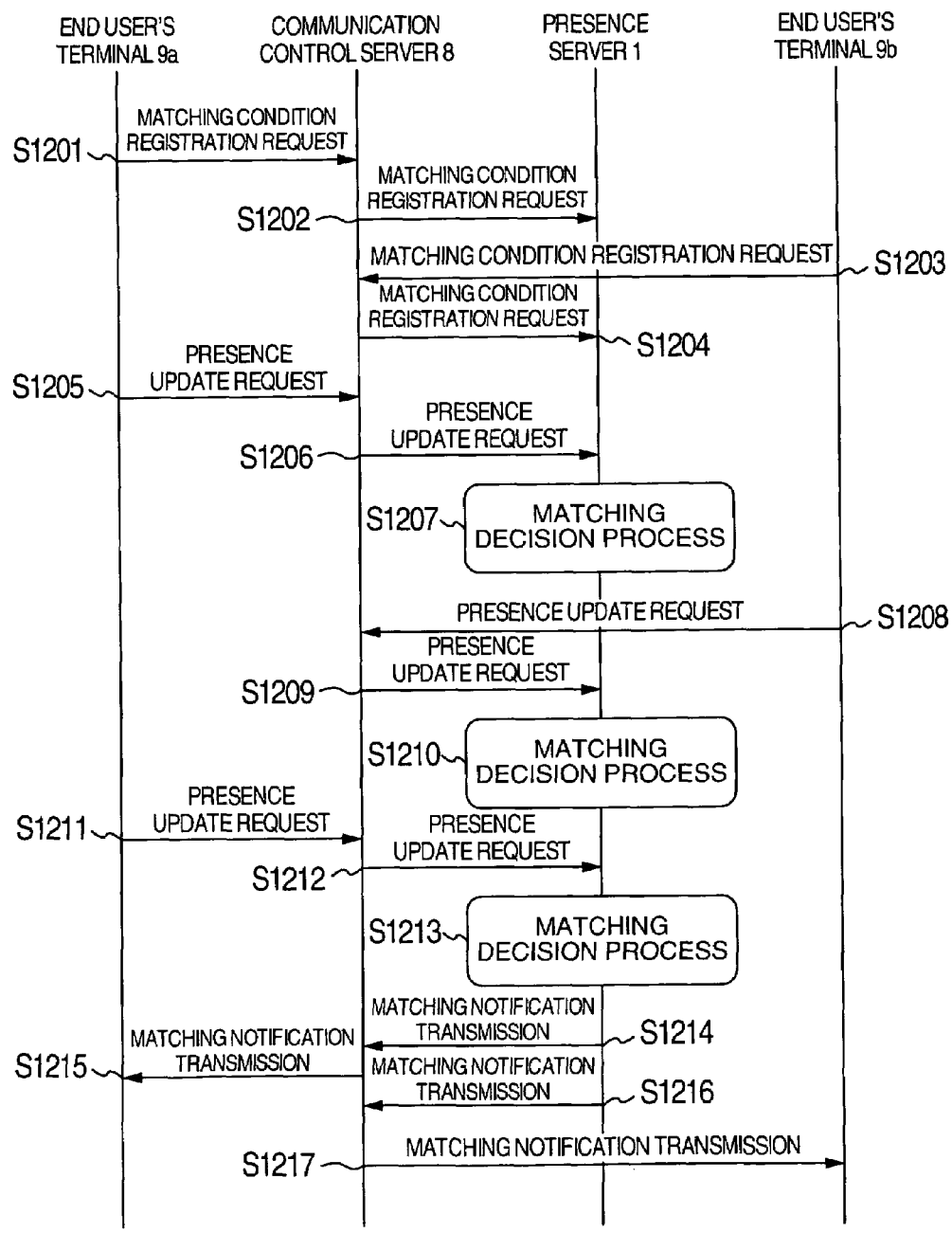
FIG. 12 shows the communication sequence in the second embodiment.

Next, the communication sequence of this embodiment will be described with reference to FIG. 12.

First, a user's terminal 9a of the end user user-a sends a matching condition registration request to the communication control server 8 (S1201). This matching condition registration request includes the user ID of the end user user-a and a matching condition designated by the end user user-a in the condition designation window 1100. For example, assume in this embodiment that the end user user-a has designated "Status=Online & URL=http://www.abc.net/~a/*" as the matching condition. The message relay processor 901 of the communication control server 8 transfers this matching condition registration request to the presence server 1 (S1202).

Upon receiving the matching condition registration request, the communication control program 10 of the presence server 1 transfers it to the protocol analysis program 11. Then, the protocol analysis program 11 analyzes the syntax of the matching condition registration request to extract the user ID and the matching condition. The matching condition registration program 15 searches the user table 30 using the user ID as the key and updates the matching condition in the matching condition 303 of a matched record. The same communication processing is performed also for the user's terminal 9b of the end user user-b (S1203, S1204). Here, assume that the end user user-b has designated "Status=Online & URL=http://www.abc.net/~b/*" as the matching condition.

Next, the user's terminal 9a sends a presence update request to the communication control server 8 (S1205). This presence update request includes the user ID of the end user user-a, status, and URL. Here, assume that the status of the end user user-a is "Online" and that the URL is "http://www.abc.net/users.html". The message relay processor 901 of the communication control server 8 transfers this presence update request to the presence server 1 (S1206). Upon receiving the presence update request, the communication control program 10 of the presence server 1 transfers it to the protocol analysis program 11. Next, the protocol analysis program 11 analyzes the syntax of the presence update request to extract the user ID, status, and URL. The presence update program 12 searches the user table 30 using the user ID as the key and updates the status 304 and the URL 305 of a matched record.

Next, the matching decision program 13 executes matching decision process as shown in FIG. 7 and FIG. 8 (S1207). Because the presence of the end user user-a does not match the condition of the end user user-b at this time, the matching decision program 13 does not add the record to the matching table 31.

The same communication processing is performed also for the user's terminal 9b (S1208 to S1210). Assume that the status of the end user user-b is "Online" and that the URL is "http://www.abc.net/~a/index.html". Because the presence of the end user user-b matches the condition of the end user user-a when the matching decision process S1210 is executed, the matching decision program 13 adds the record to the matching table 31.

In addition, the same communication processing as that in S1205 to S1207 is performed for the user's terminal 9a (S1211 to S1213). Note that the URL of the end user user-a has been updated to "http://www.abc.net/~b/index.html". Because the presence of the end user user-a matches the matching condition of the end user user-b at this time, the matching decision program 13 judges, in the matching decision process S1213, that a two-way match has occurred and the matching notification program 14 sends a matching notification, addressed to the end user user-a, to the communication control server 8 (S1214). This matching notification includes the user ID of the end user user-b. The message relay processor 901 of the communication control server 8 sends the received matching notification to the user's terminal 9a (S1215). A matching notification is sent also to the end user user-b (S1216 to S1217).

The communication system in the second embodiment described above allows the end users browsing the same web page or the end users browsing each other's web page to communicate, thus providing a service that activates real-time communication.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A presence management apparatus connected to a first apparatus and a second apparatus via a network, for managing presence representing a dynamic attribute of a user using said first apparatus or said second apparatus, the presence management apparatus comprising:
    a user table for registering therein for each user a user ID, a presence of said user, and a matching condition for the presence which is designated by said user with respect to another user;
    presence update means for updating a first user's presence registered in said user table based on an update request received from the first apparatus, or updating second user's presence registered in said user table based on an update request received from the second apparatus, wherein the first user uses the first apparatus and the second user uses the second apparatus;
    matching condition registration means for registering at said user table, a matching condition for another user's presence including the second user's presence received from the first apparatus and designated by the first user and a matching condition for another user's presence including the first user's presence received from the second apparatus and designated by the second user; and
    matching decision means of a bidirectional matching decision between the first and second users, for deciding if the updated first user's presence matches the matching condition designated by the second user and the second user's presence matches the registered matching condition designated by the first user, when the matching condition registration means performs matching condition registration processing for the matching condition designated by the first user or the matching condition designated by the second user, wherein
    when said presence update means updated the first user's presence or the second user's presence registered in said user table based on an update request, in a case that said first user's presence matches with the matching condition designated by the second user and also the second user's presence matches with the matching condition designated by the first user, said matching decision means decides that both of the matching conditions relating to said first user's and second user's presences coincide with each other.

2. The presence management apparatus according to claim 1, comprising
    matching notification means for, after updating process by said presence update means, notifying the first and/or the second apparatus that, when the matching decision means decided that said first user's presence matches with the matching condition designated by the second user and also the second user's presence matches with the matching condition designated by the first user, the matching has been satisfied.

3. The presence management apparatus according to claim 1,
    wherein the matching condition registered by the matching condition registration means includes a combination of a logical sum and/or a logical product of a condition for two or more presences.

4. The presence management apparatus according to claim 1, comprising
    a matching table for storing an identifier of the second user as one of matching candidates for an identifier of the first user when it is decided that the first user's presence matches the matching condition designated by the second user and the second user's presence does not match the matching condition designated by the first user.

5. The presence management apparatus according to claim 4,
    wherein, when said matching decision means, in the decision process, searches said user table and decides that the updated second user's presence matches the matching condition designated by the first user, said matching decision means searches said matching table to check whether the identifier of the second user has been stored in the matching table as one of matching candidates for the identifier of the first user.

6. The presence management apparatus according to claim 5,
    wherein, said matching decision means checks said matching table, and when the identifier of the second user has been stored in the matching table as one of matching candidates for the identifier of the first user, the matching decision means decides that the both matching conditions are satisfied.

7. The presence management apparatus according to claim 4,
    wherein, for the first user and the second user whose identifiers are stored as the matching candidates in said matching table, when the matching decision means decides that the first user's presence which was updated does not match the matching condition designated by the second user, the matching decision means deletes the identifier of the first user and the identifier of the second user stored as the matching candidates for the identifier of the first user from the matching table.

8. An information delivery system in which a first apparatus, a second apparatus, and a presence management apparatus are connected via a network, for managing presence representing dynamic attribute of a user using said first apparatus or said second apparatus, wherein the presence management apparatus comprises:

a user table for registering therein for each user a user ID, a presence of said user, and a matching condition for the presence which is designated by said user with respect to another user;

presence update means for updating a first user's presence registered in said user table based on an update request received from the first apparatus, or updating a second user's presence registered in said user table based on an update request received from the second apparatus, wherein the first user uses the first apparatus and the second user uses the second apparatus;

matching condition registration means for registering at said user table, a matching condition for another user's presence including the second user's presence received from the first apparatus and designated by the first user and a matching condition for another user's presence including the first user's presence received from the second apparatus and designated by the second user; and matching decision means of a bidirectional matching decision between the first and second users, for deciding if the updated first user's presence matches the matching condition designated by the second user and the second user's presence matches the registered matching condition designated by the first user, when the matching condition registration means performs matching condition registration processing for the matching condition designated by the first user or the matching condition designated by the second user, wherein when said presence update means updated the first user's presence or the second user's presence registered in said user table based on an update request, in a case that said first user's presence matches with the matching condition designated by the second user and also the second user's presence matches with the matching condition designated by the first user, said matching decision means decides that both of the matching conditions relating to said first user's and second user's presences coincide with each other; and matching notification means for, after updating process by said presence update means, notifying the first and/or the second apparatus that, when the matching decision means decided that said first user's presence matches with the matching condition designated by the second user and also the second user's presence matches with the matching condition designated by the first user, the matching has been satisfied, wherein the first apparatus comprises means for delivering information to the second apparatus.

9. The information delivery system according to claim 8, wherein the matching condition registered by the matching condition registration means of the presence management apparatus includes a combination of a logical sum and/or a logical product of a condition for two or more presences.

10. The information delivery system according to claim 8, comprising a matching table for storing an identifier of the second user as one of matching candidates for an identifier of the first user when it is decided that the first user's presence matches the matching condition designated by the second user and the second user's presence does not match the matching condition designated by the first user.

11. The information delivery system according to claim 10, wherein, when said matching decision means, in the decision process, searches said user table and decides that the updated second user's presence matches the matching condition designated by the first user, said matching decision means searches said matching table to check whether the identifier of the second user has been stored in the matching table as one of matching candidates for the identifier of the first user.

12. The information delivery system according to claim 11, wherein, said matching decision means checks said matching table, and when the identifier of the second user has been stored in the matching table as one of matching candidates for the identifier of the first user, the matching decision means of the presence management apparatus decides that the both matching conditions are satisfied.

13. The information delivery system according to claim 10, wherein, for the first user and the second user whose identifiers are stored as the matching candidates in said matching table, when the matching decision means of the presence management apparatus decides that the first user's presence which was updated does not match the matching condition designated by the second user, the matching decision means deletes the identifier of the first user and the identifier of the second user stored as the matching candidates for the identifier of the first user from the matching table.

14. The presence management apparatus according to claim 1, wherein a presence updated in response to the update request includes information about a location of an apparatus used by said user or a status of said user.

15. The information delivery system according to claim 8, wherein a presence updated in response to the update request includes information about a location of an apparatus used by said user or a status of said user.

* * * * *